United States Patent
Comay et al.

(10) Patent No.: US 7,567,985 B1
(45) Date of Patent: Jul. 28, 2009

(54) MECHANISM FOR IMPLEMENTING A SPARSE FILE SYSTEM FOR AN OPERATING SYSTEM PARTITION

(75) Inventors: David S. Comay, Oakland, CA (US); Andrew G. Tucker, Menlo Park, CA (US); Tim P. Marsland, Half Moon Bay, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1262 days.

(21) Appl. No.: 10/767,118

(22) Filed: Jan. 28, 2004

Related U.S. Application Data (60) Provisional application No. 60/469,558, filed on May 9, 2003.

(51) Int. Cl.
*G06F 17/30* (2006.01)
(52) U.S. Cl. .......................... 707/200; 707/1
(58) Field of Classification Search ......... 707/200–206, 707/1
See application file for complete search history.

(56) References Cited

U.S. PATENT DOCUMENTS

| | | |
|---|---|---|
| 5,155,809 A | 10/1992 | Baker et al. |
| 5,283,868 A | 2/1994 | Baker et al. |
| 5,291,597 A | 3/1994 | Shorter et al. |
| 5,325,517 A | 6/1994 | Baker et al. |
| 5,325,526 A | 6/1994 | Cameron et al. |
| 5,345,590 A | 9/1994 | Ault et al. |
| 5,437,032 A | 7/1995 | Wolf et al. |
| 5,590,314 A | 12/1996 | Ueno et al. |
| 5,682,530 A | 10/1997 | Shimamura |
| 5,841,869 A | 11/1998 | Merkling et al. |
| 5,845,116 A | 12/1998 | Saito et al. |
| 5,925,102 A | 7/1999 | Eilert et al. |
| 5,963,911 A | 10/1999 | Walker et al. |
| 5,983,270 A | 11/1999 | Abraham et al. |
| 6,064,811 A | 5/2000 | Spilo et al. |
| 6,074,427 A | 6/2000 | Fought et al. |
| 6,247,109 B1 | 6/2001 | Kleinsorge et al. |

(Continued)

FOREIGN PATENT DOCUMENTS

EP  389151 A2  9/1990

(Continued)

OTHER PUBLICATIONS

European Patent Office, "Communication pursuant to Article 94(3) EPC", Foreign application No. 04 252 690.5—2211, received Jun. 17, 2008, 5 pages.

(Continued)

*Primary Examiner*—Cheryl Lewis
(74) *Attorney, Agent, or Firm*—Osha • Liang LLP (57) ABSTRACT

A mechanism is disclosed for implementing a sparse file system for an operating system partition. In one implementation, a non-global partition is created within a global operating system environment. A file system is then established for the non-global partition. This file system may comprise one or more virtual directories, which reference other directories. Referencing other directories in this manner makes it is possible to avoid having to copy all of the files used by processes running in the non-global partition into the file system. As a result, storage and other system resources can be saved.

51 Claims, 5 Drawing Sheets

U.S. PATENT DOCUMENTS

| | | | |
|---|---|---|---|
| 6,289,462 | B1 | 9/2001 | McNabb et al. |
| 6,356,915 | B1 * | 3/2002 | Chtchetkine et al. ........ 707/200 |
| 6,438,594 | B1 | 8/2002 | Bowman-Amuah |
| 6,557,168 | B1 | 4/2003 | Czajkowski |
| 6,681,238 | B1 | 1/2004 | Brice et al. |
| 6,701,460 | B1 | 3/2004 | Suwandi et al. |
| 6,725,457 | B1 | 4/2004 | Priem et al. |
| 6,738,832 | B2 | 5/2004 | Burr et al. |
| 6,792,514 | B2 | 9/2004 | Kapoor et al. |
| 6,813,766 | B2 | 11/2004 | Hay |
| 6,859,926 | B1 | 2/2005 | Brenner et al. |
| 6,938,169 | B1 * | 8/2005 | Caronni et al. ................. 726/4 |
| 6,944,699 | B1 | 9/2005 | Bugnion et al. |
| 6,957,435 | B2 | 10/2005 | Armstrong et al. |
| 6,961,941 | B1 | 11/2005 | Nelson et al. |
| 6,993,762 | B1 | 1/2006 | Pierre |
| 7,027,463 | B2 | 4/2006 | Mathew et al. |
| 7,051,340 | B2 | 5/2006 | Fisher et al. |
| 7,076,633 | B2 | 7/2006 | Tormasov et al. |
| 7,096,469 | B1 | 8/2006 | Kubala et al. |
| 7,099,948 | B2 | 8/2006 | Tormasov et al. |
| 7,103,745 | B2 | 9/2006 | Koning et al. |
| 7,188,120 | B1 | 3/2007 | Leonard et al. |
| 7,194,439 | B2 | 3/2007 | Kassan et al. |
| 7,363,495 | B2 | 4/2008 | Felt et al. |
| 7,461,144 | B1 | 12/2008 | Beloussov et al. |
| 2002/0069369 | A1 | 6/2002 | Tremain |
| 2002/0083367 | A1 | 6/2002 | McBride et al. |
| 2002/0120660 | A1 | 8/2002 | Hay et al. |
| 2002/0156824 | A1 | 10/2002 | Armstrong et al. |
| 2002/0161817 | A1 | 10/2002 | Dorofeev et al. |
| 2002/0173984 | A1 | 11/2002 | Robertson et al. |
| 2002/0174215 | A1 | 11/2002 | Schaefer |
| 2003/0014466 | A1 | 1/2003 | Berger et al. |
| 2003/0037092 | A1 | 2/2003 | McCarthy et al. |
| 2004/0210760 | A1 | 10/2004 | McGrath et al. |
| 2004/0215848 | A1 | 10/2004 | Craddock et al. |
| 2005/0021788 | A1 | 1/2005 | Tucker et al. |

FOREIGN PATENT DOCUMENTS

| | | | |
|---|---|---|---|
| EP | 1043658 | A1 | 10/2000 |
| EP | 1 253 516 | A2 | 10/2002 |
| EP | 1253516 | A2 | 10/2002 |
| EP | 1282038 | A2 | 2/2003 |
| EP | 1300766 | A | 4/2003 |

OTHER PUBLICATIONS

Current Claims, Foreign application No. 04 252 690.5—2211, 9 pages.
Mc Dougall, Richard, et al., "Resource Management", Prentice Hall, 1999, 25 pages.
U.S. Appl. No. 10/833,474, filed Apr. 27, 2004.
U.S. Appl. No. 10/767,117, filed Jan. 28, 2004.
U.S. Appl. No. 10/766,094, filed Jan. 27, 2004.
U.S. Appl. No. 10/744,360, filed Dec. 22, 2003.
U.S. Appl. No. 10/763,147, filed Jan. 21, 2004.
U.S. Appl. No. 10/769,415, filed Jan. 30, 2004.
U.S. Appl. No. 10/761,622, filed Jan. 20, 2004.
U.S. Appl. No. 10/767,003, filed Jan. 28, 2004.
U.S. Appl. No. 10/762,067, filed Jan. 20, 2004.
U.S. Appl. No. 10/762,066, filed Jan. 20, 2004.
U.S. Appl. No. 10/767,235, filed Jan. 28, 2004.
U.S. Appl. No. 10/771,827, filed Feb. 3, 2004.
U.S. Appl. No. 10/771,698, filed Feb. 3, 2004.
U.S. Appl. No. 10/768,303, filed Jan. 29, 2004.
Czajkowski, G., "Application isolation in the Java Virtual Machine", 2000, ACM Press, Proceedings of the 15$^{th}$ ACM SIGPLAN Conference on Object-Oriented Programming, Systems, Languages, and Applications, pp. 354-366.
Czajkowski, G., "Multitasking without compromise: a virtual machine evolution", ACM Press, Proceedings of the 16$^{th}$ ACM SIGPLAN Conference on Object Oriented Programming, Systems, Languages, and Applications, dated Oct. 2001, pp. 125-138.
Osman, S., et al., "The design and implementation of Zap: a system for migrating computing environments", SIGOPS Operating System, Rev. 36, SI, dated Dec. 2000, pp. 361-376.
Presotto et al., "Interprocess Communication in the Ninth Edition Unix System", John Wiley & Sons, Ltd., dated Mar. 1990, 4 pages.
Stevens, "Advanced programming in the Unix Environment", Addison-Wesley, 1993, pp. 427-436.
Watson, "TrustedBSD—Adding Trusted Operating System Features to FreeBSD", The USENIX Association, 2001, 14 pages.
Noordende et al., "Secure and Portable Confinement of Untrusted Programs", ACM, 2002, 14 pages.
Hope, " Using Jails in FreeBSD for fun and profit", ;Login: The Magazine of USENIX &SAGE, vol. 27, No. 3, dated Jun. 2002, pp. 48-55.
Hewlett-Packard, "Installing and Managing HP-UX Virtual Partitions (vPars)", Third Edition, Part No. T1335-90018, Copyright Hewlett-Packard Company, Nov. 2002, pp. 1-4, 17-44, 72-75, and 157-161.
Hope, Paco, "Using Jails in FreeBSD for Fun and Profit", ;Login: The Magazine of Usenix and Sage, vol. 27, No. 3, Jun. 2002, 9 pages.
Kamp, Poul-Henning, "Rethinking / dev and devices in the UNIX kernel", BSDCon 2002 Paper, retrieved from website <http://www.usenix.org/events/bsdcon02/full_papers/kamp/kamp_html/index.html> Printed May 1, 2007, 18 pages.
Thompson, J., "UNIX Implementation", Bell Laboratories, The Bell System Technical Journal, 1978, pp. 1-9.
European Patent Office, "European Search Report," application No. 04252689.7, mailing date Jul. 28, 2005, 3 pages.
Current Claims, European patent application 04252689.7, 6 pages.
Sun Microsystems, "Sun EnterpriseTM 1000 Server: Dynamic System Domains," White Paper Online, Feb. 26, 2003, retrieved from the internet at <http://www.sun.com/servers/highend/whitepapers/domains.html?facet=-1>, retrieved on Jun. 21, 2005, XP-002332946, 7 pages.
Official Action from EPO for foreign patent application No. 04 252 690.5—2211 dated Nov. 23, 2005 (5 pgs)—attached.
Current Claims in EPO patent application No. 04 252 690.5—2211 (9 pgs)—attached.
Communications from the ACM (ISSN: 0001-0782) vol. 44, Issue 2 (2001) entitled "An Operating System Approach to Securing E-Services" by Chris Dalton and Tse Huong Choo, ACM Copyright Notice, © 2001, (8 pgs).
Sun Microsystems, Inc. entitled Server Virtualization with Trusted Solaris ™ 8 Operating Environment, by Glenn Faden, Sun BluePrints ™ OnLine—Feb. 2002, http://www.sun.com/blueprints, (21 pgs).
Network Working Group entitled "IP Version 6 Addressing Architecture", by R. hinden, Nokia, S. Deering, Cisco System, dtd Jul. 1998, (28 pgs).
IBM entitled Partitioning for the IBM eserver pSeries 690 System, © Copyright IBM Corp. 2001 (12 pgs).
IBM System Partitioning on IBM eserver xSeries Servers entitled "Effective Server Consolidation and Resource Management with System Partitioning", by Mark T. Chapman, IBM Server Group, dtd Dec. 2001, (23 pgs).
Virtual Private Servers and Security Contexts, dtd May 10, 2004, http://www.solucorp.qc.ca/miscprj/s_content.hc?prjstate=1&nodoc=0, (2 pgs).
SunSoft, a Sun Microsystems, Inc. Business entitled "File System Administration", © 1994 Sun Microsystems, Inc., (62 pgs).
Jails: Confining the omnipotent root., by Poul-Henning Kamp and Robert N.M. Watson, entitled "The FreeBSD Project", http://www.servetheweb.com/, (15 pgs).

European Search Report from the European Patent Office for Foreign Patent Application No. 04252690.5 (3 pgs.).
Claims As Filed in European Patent Application No. 04252690.5 (6 pgs.).
Poul-Henning Kamp, et al., "Jails: Confining the omnipotent root", $2^{nd}$ Intl System Administration and Networking Conference Proceedings "SANE 2000", May 22-25, 2000, Maastricht, The Netherlands.

European Patent Office, "Result of Consultation", Application No. 04252689.7-1243, dated Aug. 11, 2008, 2 pages.
Claims, Application No. 04252689.7-1243, 5 pages.
Official Action from EPO for foreign patent application No. 04 252 690.5—2211 dated Jun. 10, 2005 (6 pgs)—attached.

* cited by examiner

MECHANISM FOR IMPLEMENTING A SPARSE FILE SYSTEM FOR AN OPERATING SYSTEM PARTITION

RELATED APPLICATIONS

This application claims priority to U.S. Provisional Application Ser. No. 60/469,558, filed May 9, 2003, entitled OPERATING SYSTEM VIRTUALIZATION by Andrew G. Tucker, et al., the entire contents of which are incorporated herein by this reference.

BACKGROUND

Many of today's computing systems include computing resources that are not fully utilized. The owners of these systems often could benefit by increasing the utilization of these systems' computing resources.

A number of approaches could be adopted to increase utilization. Under a "consolidation" approach, the processes and data of multiple parties might be co-located on a single hardware unit in order to more fully utilize the resources of the hardware unit. Under the consolidation approach, multiple parties might share a single hardware unit's resources, including file systems, network connections, and memory structures. For example, multiple businesses might have separate websites that are hosted by the same server.

However, some of the parties might not know or trust each other. In some cases, some of the parties might actually be competitors. Under such circumstances, each party would want to ensure that its processes and data are shielded, or isolated, from access by other parties and those other parties' processes.

Mechanisms that would isolate one party's processes and data from other parties sharing the same hardware unit have been proposed. For example, a "jail" mechanism provides the ability to partition an operating system environment into a "non-jailed" environment and one or more "jailed" environments. The jail mechanism allows users, processes, and data to be associated with a jailed environment. For example, one group of users, processes, and data may be associated with one jailed environment, and another group of users, processes, and data may be associated with another jailed environment. The jail mechanism restricts users and processes that are associated with a particular jailed environment from accessing processes and data that are associated with environments (both jailed and non-jailed) other than the particular jailed environment.

Under the jail approach, each jail has its own associated file system, which cannot be accessed by processes running within any other jail. The file system associated with a jail contains all of the files that are used by processes running within that jail, including some files that are particular to that jail, and many general files (e.g. operating system files, shared library files, etc.), that are used by many or all jails. Because each jail maintains its own file system, and because each file system contains all of the files used by that jail, if there are multiple jails, there will be multiple jail file systems, which means that there will be multiple copies of the general files. If the number of general files is large (as is usually the case), this can lead to the redundant storage of a large number of general files, which in turn leads to waste of storage and other system resources.

SUMMARY

In accordance with one embodiment of the present invention, there is provided a mechanism for implementing a sparse file system for an operating system partition. According to this mechanism, it is not necessary to maintain in the file system of a partition a copy of every file that is used by that partition. Rather, the file system of the partition can make reference to another file system, or a portion thereof, at which a set of files is stored. By allowing the file system of a partition to reference another file system in this manner, this mechanism makes it possible for the file systems of multiple partitions to reference the same file system, and hence, share the same set of files. As a result, it is no longer necessary to maintain a separate copy of the set of files in the file system of each partition, which leads to resource savings.

In accordance with one embodiment, a non-global partition is created within a global operating system environment provided by an operating system. This non-global partition serves to isolate processes running within that non-global partition from other non-global partitions within the global operating system environment. A file system is then established for this non-global partition. This file system is associated with the non-global partition, and cannot be accessed by processes running in any non-global partition other than this non-global partition.

In one embodiment, this file system comprises at least one virtual directory, which does not contain actual files but rather has associated therewith a reference to another particular file system directory. In one embodiment, the other particular file system directory is mounted onto the virtual directory. When the mounting operation is performed, some semantics information is stored and associated with the virtual directory. The semantics information may include, for example, an indication that the virtual directory is part of a virtual file system (in one embodiment, a loopback file system). The semantics information may further include the reference to the other particular file system directory.

When it comes time to access one or more files within the virtual directory, the file system is traversed to the virtual directory, and the reference is followed to the other particular file system directory. The one or more files are then accessed from the other particular file system directory, or a subdirectory thereof. Thus, even though the files are not actually stored within the file system of the non-global partition, they can be accessed as if they were. As a result, the file system of the non-global partition can be sparsely populated.

In one embodiment, the file systems of multiple non-global partitions may reference the same particular file system directory. Hence, multiple non-global partitions may share the same set of files.

DETAILED DESCRIPTION OF EMBODIMENT(S)

Conceptual Overview

Figure 2:
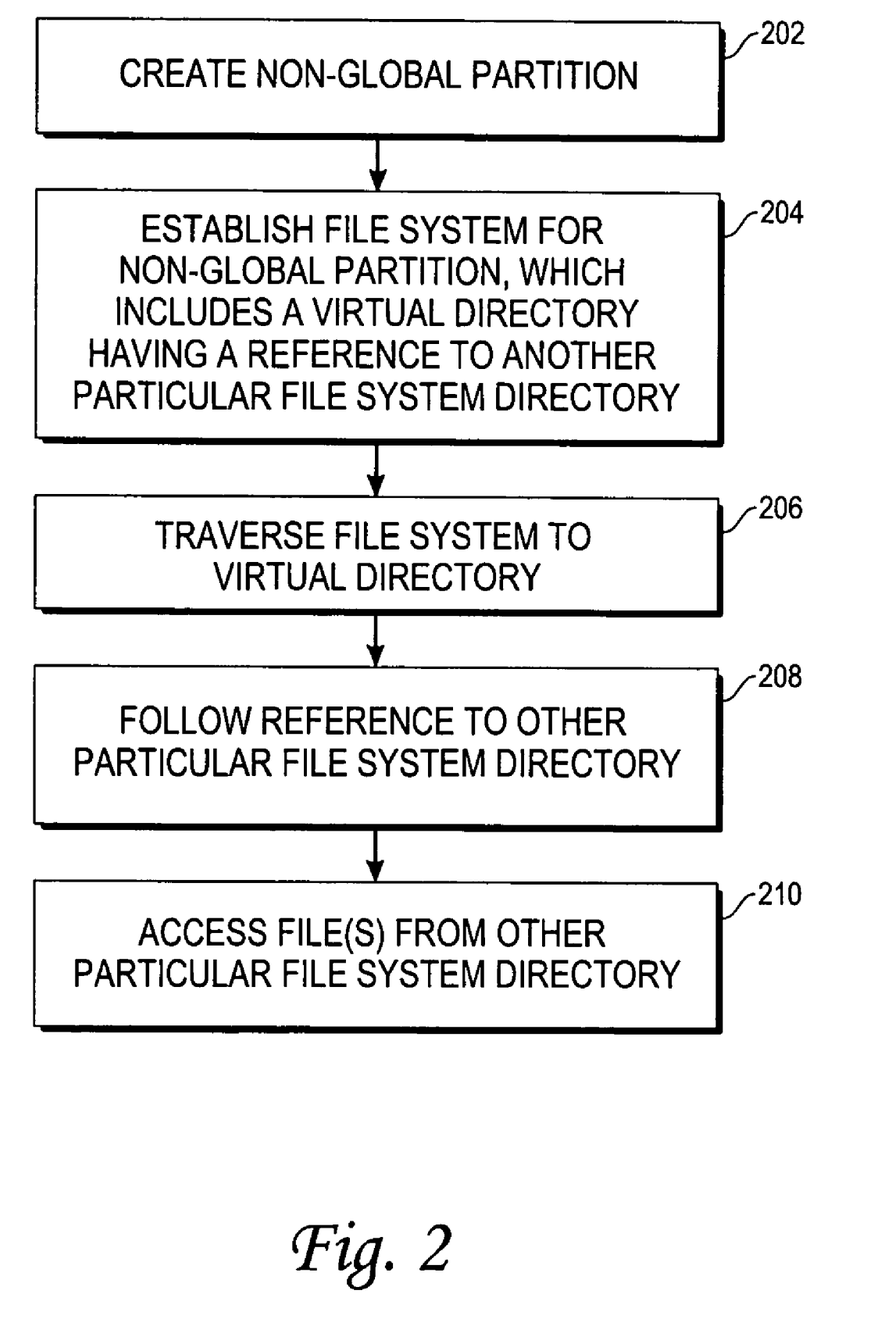
FIG. 2 is an operational flow diagram, which provides a high-level conceptual overview of one embodiment of the present invention.

In accordance with one embodiment of the present invention, there is provided a mechanism for implementing a sparse file system for an operating system partition. FIG. 2 shows an operational flow diagram, which provides a high-level conceptual overview of this embodiment. As shown in FIG. 2, a non-global partition is created (block 202) within a global operating system environment provided by an operating system. This non-global partition serves to isolate processes running within the non-global partition from other non-global partitions within the global operating system environment. A file system is then established (block 204) for this non-global partition. This file system is associated with the non-global partition, and cannot be accessed by processes running in any non-global partition other than this non-global partition.

In one embodiment, this file system comprises at least one virtual directory, which does not contain actual files but rather has associated therewith a reference to another particular file system directory. In one embodiment, as part of establishing the file system, the other particular file system directory is mounted onto the virtual directory. When the mounting operation is performed, some semantics information is stored and associated with the virtual directory. The semantics information may include, for example, an indication that the virtual directory is part of a virtual file system (in one embodiment, a loopback file system, as will be explained in greater detail in a later section). The semantics information may further include the reference to the other particular file system directory.

During regular operation, it may be desirable to access one or more files within the virtual directory. When it comes time to do so, the file system is traversed (block 206) to the virtual directory. The reference is then followed (block 208) to the other particular file system directory. The one or more files are then accessed (block 210) from the other particular file system directory, or a subdirectory thereof. Thus, even though the files are not actually stored within the file system of the non-global partition, they can be accessed as if they were. As a result, the file system of the non-global partition can be sparsely populated.

In one embodiment, the file systems of multiple non-global partitions may reference the same particular file system directory. Hence, multiple non-global partitions may share the same set of files.

The above discussion provides a high-level overview of one embodiment of the present invention. With reference to an example, this embodiment will now be described in greater detail.

System Overview

Figure 1:
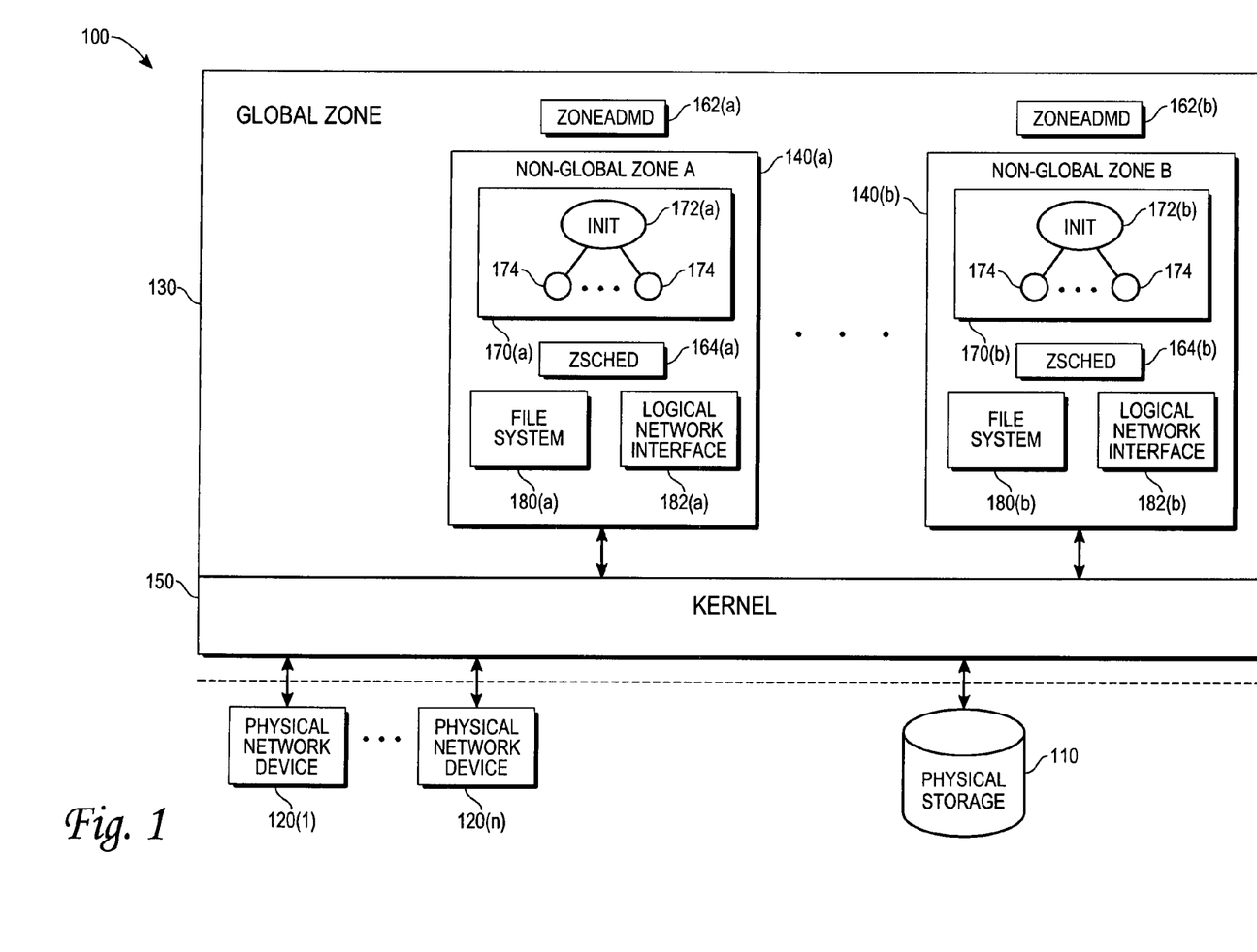
FIG. 1 is a functional diagram of an operating system environment comprising a global zone and one or more non-global zones, in accordance with one embodiment of the present invention.

FIG. 1 illustrates a functional block diagram of an operating system (OS) environment 100 in accordance with one embodiment of the present invention. OS environment 100 may be derived by executing an OS in a general-purpose computer system, such as computer system 500 illustrated in FIG. 5, for example. For illustrative purposes, it will be assumed that the OS is Solaris manufactured by Sun Microsystems, Inc. of Santa Clara, Calif. However, it should be noted that the concepts taught herein may be applied to any OS, including but not limited to Unix, Linux, Windows, MacOS, etc.

As shown in FIG. 1, OS environment 100 may comprise one or more zones (also referred to herein as partitions), including a global zone 130 and zero or more non-global zones 140. The global zone 130 is the general OS environment that is created when the OS is booted and executed, and serves as the default zone in which processes may be executed if no non-global zones 140 are created. In the global zone 130, administrators and/or processes having the proper rights and privileges can perform generally any task and access any device/resource that is available on the computer system on which the OS is run. Thus, in the global zone 130, an administrator can administer the entire computer system. In one embodiment, it is in the global zone 130 that an administrator executes processes to configure and to manage the non-global zones 140.

The non-global zones 140 represent separate and distinct partitions of the OS environment 100. One of the purposes of the non-global zones 140 is to provide isolation. In one embodiment, a non-global zone 140 can be used to isolate a number of entities, including but not limited to processes 170, one or more file systems 180, and one or more logical network interfaces 182. Because of this isolation, processes 170 executing in one non-global zone 140 cannot access or affect processes in any other zone. Similarly, processes 170 in a non-global zone 140 cannot access or affect the file system 180 of another zone, nor can they access or use the logical network interface 182 of another zone. As a result, the processes 170 in a non-global zone 140 are limited to accessing and affecting the processes and entities in that zone. Isolated in this manner, each non-global zone 140 behaves like a virtual standalone computer. While processes 170 in different non-global zones 140 cannot access or affect each other, it should be noted that they may be able to communicate with each other via a network connection through their respective logical network interfaces 182. This is similar to how processes on separate standalone computers communicate with each other.

Having non-global zones 140 that are isolated from each other may be desirable in many implementations. For example, if a single computer system running a single instance of an OS is to be used to host applications for different competitors (e.g. competing websites), it would be desirable to isolate the data and processes of one competitor from the data and processes of another competitor. That way, it can be ensured that information will not be leaked between the competitors. Partitioning an OS environment 100 into non-global zones 140 and hosting the applications of the competitors in separate non-global zones 140 is one possible way of achieving this isolation.

In one embodiment, each non-global zone 140 may be administered separately. More specifically, it is possible to assign a zone administrator to a particular non-global zone 140 and grant that zone administrator rights and privileges to manage various aspects of that non-global zone 140. With such rights and privileges, the zone administrator can perform any number of administrative tasks that affect the processes and other entities within that non-global zone 140. However, the zone administrator cannot change or affect anything in any other non-global zone 140 or the global zone 130. Thus, in the above example, each competitor can administer his/her zone, and hence, his/her own set of applications, but cannot change or affect the applications of a competitor. In one embodiment, to prevent a non-global zone 140 from affecting other zones, the entities in a non-global zone 140 are generally not allowed to access or control any of the physical devices of the computer system.

In contrast to a non-global zone administrator, a global zone administrator with proper rights and privileges may administer all aspects of the OS environment 100 and the computer system as a whole. Thus, a global zone administrator may, for example, access and control physical devices, allocate and control system resources, establish operational parameters, etc. A global zone administrator may also access and control processes and entities within a non-global zone 140.

In one embodiment, enforcement of the zone boundaries is carried out by the kernel 150. More specifically, it is the kernel 150 that ensures that processes 170 in one non-global zone 140 are not able to access or affect processes 170, file systems 180, and logical network interfaces 182 of another zone (non-global or global). In addition to enforcing the zone boundaries, kernel 150 also provides a number of other services. These services include but are certainly not limited to mapping the logical network interfaces 182 of the non-global zones 140 to the physical network devices 120 of the computer system, and mapping the file systems 180 of the non-global zones 140 to an overall file system and a physical storage 110 of the computer system. The operation of the kernel 150 will be discussed in greater detail in a later section.

Non-Global Zone States

In one embodiment, a non-global zone 140 may take on one of four states: (1) Configured; (2) Installed; (3) Ready; and (4) Running. When a non-global zone 140 is in the Configured state, it means that an administrator in the global zone 130 has invoked an operating system utility (in one embodiment, zonecfg) to specify all of the configuration parameters of a non-global zone 140, and has saved that configuration in persistent physical storage 110. In configuring a non-global zone 140, an administrator may specify a number of different parameters. These parameters may include, but are not limited to, a zone name, a zone path to the root directory of the zone's file system 180, specification of one or more file systems to be mounted when the zone is created, specification of zero or more network interfaces, specification of devices to be configured when the zone is created, and zero or more resource controls to be imposed on the zone.

Once a zone is in the Configured state, a global administrator may invoke another operating system utility (in one embodiment, zoneadm) to put the zone into the Installed state. When invoked, the operating system utility interacts with the kernel 150 to install all of the necessary files and directories into the zone's root directory, or a subdirectory thereof.

To put an Installed zone into the Ready state, a global administrator invokes an operating system utility (in one embodiment, zoneadm again), which causes a zoneadmd process 162 to be started (there is a zoneadmd process associated with each non-global zone). In one embodiment, zoneadmd 162 runs within the global zone 130 and is responsible for managing its associated non-global zone 140. After zoneadmd 162 is started, it interacts with the kernel 150 to establish the non-global zone 140. In establishing a non-global zone 140, a number of operations are performed, including but not limited to creating a zone (e.g. assigning a zone ID, creating a zone data structure, etc.), starting a zsched process 164 (zsched is a kernel process; however, it runs within the non-global zone 140, and is used to track kernel resources associated with the non-global zone 140), establishing a file system 180, plumbing logical network interfaces 182, configuring devices, and setting resource controls. These and other operations put the non-global zone 140 into the Ready state to prepare it for normal operation.

Putting a non-global zone 140 into the Ready state gives rise to a persistent virtual platform on which one or more processes may be executed. This virtual platform provides the infrastructure necessary for enabling one or more processes to be executed within the non-global zone 140 in isolation from processes in other non-global zones 140. The virtual platform also makes it possible to isolate other entities such as file system 180 and network interfaces 182 within the non-global zone 140, so that the zone behaves like a virtual standalone computer.

After a non-global zone 140 is in the Ready state, it can be transitioned into the Running state by executing one or more user processes in the zone. In one embodiment, this is done by having zoneadmd 162 start an init process 172 in its associated zone. Once started, the init process 172 looks in the file system 180 of the non-global zone 140 to determine what applications to run. The init process 172 then executes those applications to give rise to one or more other processes 174. In this manner, an application environment is initiated on the virtual platform of the non-global zone 140. In this application environment, all processes 170 are confined to the non-global zone 140; thus, they cannot access or affect processes, file systems, or network interfaces in other zones. The application environment exists so long as one or more user processes are executing within the non-global zone 140.

After a non-global zone 140 is in the Running state, its associated zoneadmd 162 can be used to manage it. Zoneadmd 162 can be used to initiate and control a number of zone administrative tasks. These tasks may include, for example, halting and rebooting the non-global zone 140. When a non-global zone 140 is halted, it is brought from the Running state down to the Installed state. In effect, both the application environment and the virtual platform are terminated. When a non-global zone 140 is rebooted, it is brought from the Running state down to the Installed state, and then transitioned from the Installed state through the Ready state to the Running state. In effect, both the application environment and the virtual platform are terminated and restarted. These and many other tasks may be initiated and controlled by zoneadmd 162 to manage a non-global zone 140 on an ongoing basis during regular operation.

File System for a Non-Global Zone

As noted above, each non-global zone 140 has its own associated file system 180. This file system 180 is used by the processes 170 running within the associated zone 140, and cannot be accessed by processes 170 running within any other non-global zone 140 (although it can be accessed by a process running within the global zone 130 if that process has the appropriate privileges). To illustrate how a separate file system may be maintained for a non-global zone 140, reference will be made to FIG. 3.

Figure 3:
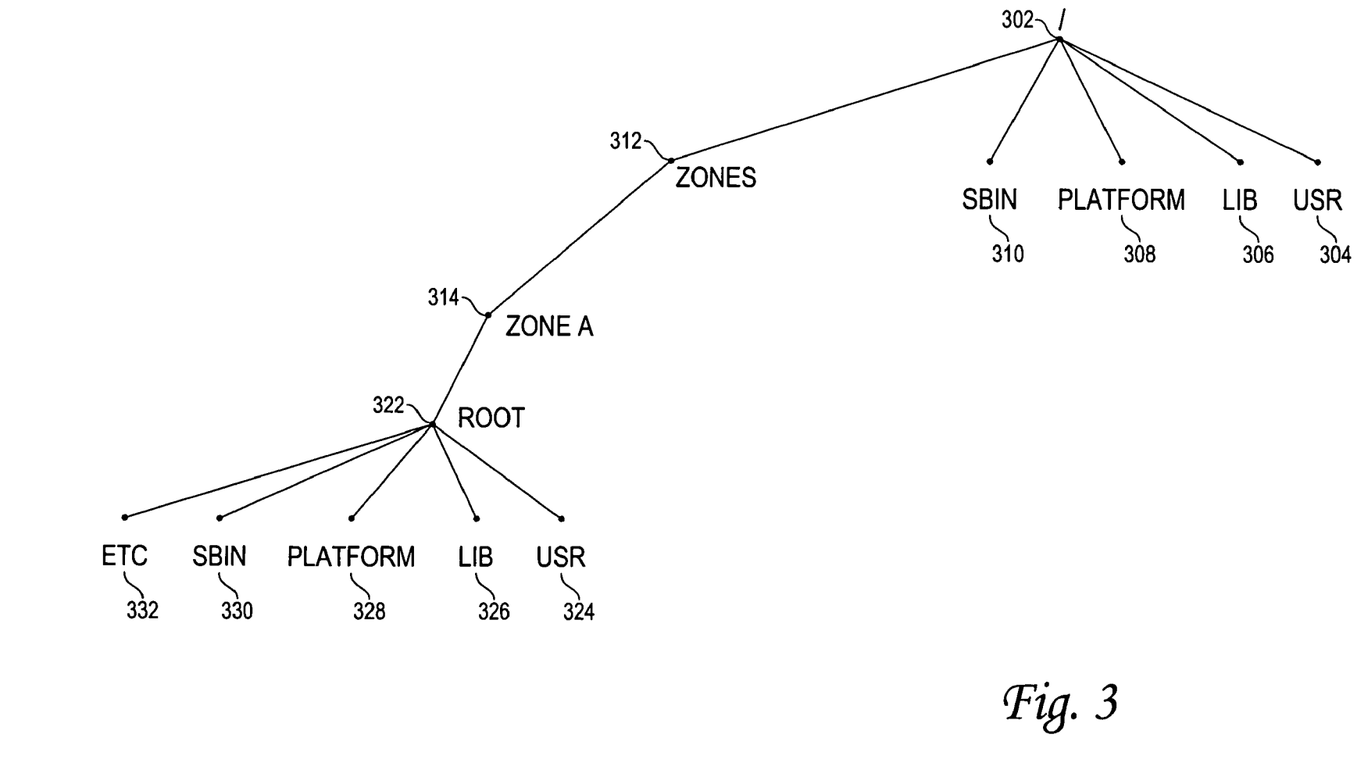
FIG. 3 shows, in tree format, a portion of an overall file system, which includes the file system of zone A of FIG. 1.

FIG. 3 shows, in tree format, a portion of an overall file system maintained by the kernel 150 for the global zone 130. This overall file system comprises a/directory 302, which acts as the root for the entire file system. Under this root directory 302 may be several directories, which contain operating system and other common files that are used regularly during operation. These directories may include but are not limited to: (1) a USR directory 304 which contains operating system command files and other executable files; (2) a LIB directory 306 which contains shared library files; (3) a PLATFORM directory 308 which contains some hardware-specific files (e.g. files which enable the OS to run on different hardware platforms (e.g. processor), such as SPARC, Intel, etc.); and (4) an SBIN directory 310 which contains system administration binary files.

Also under the/directory 302 is a path to a root directory 322 for a particular non-global zone 140. In the example shown in FIG. 3, the path is /Zones/ZoneA/Root, and the non-global zone is zone A 140(a). This root 322 acts as the root of the file system 180(a) for zone A 140(a), and everything underneath this root 322 is part of the file system 180(a) for zone A 140(a). Because root 322 is the root of the file system 180(a) for zone A 140(a), processes 170(a) within zone A 140(a) cannot traverse up the file system hierarchy beyond root 322. Thus, processes 170(a), without some other mechanism, cannot see or access any of the directories 302, 304, 306, 308, 310, 312, 314 above root 322. To processes 170(a), it is as if these and other portions of the overall file system did not exist.

Root 322 may have any number of directories, subdirectories, and files underneath it. These directories may include some directories, such as ETC 332, which contain files specific to zone A 140(a) (for example, program files which are executed in zone A 140(a), and configuration data files for zone A 140(a)). They may also include some directories, such as USR 324, LIB 326, PLATFORM 328, and SBIN 330, which are common to most if not all file systems associated with non-global zones 140. In a non-sparse or full file system implementation, directories USR 324, LIB 326, PLATFORM 328, and SBIN 330 would contain copies of the files in directories USR 304, LIB 306, PLATFORM 308, and SBIN 310, respectively, since these directories contain files that are used by all zones (global and non-global) during regular operation.

In a sparse file system implementation in accordance with one embodiment of the present invention, however, directories USR 324, LIB 326, PLATFORM 328, and SBIN 330 do not contain actual files. Rather, they are virtual directories, which reference the directories USR 304, LIB 306, PLATFORM 308, and SBIN 310. These references enable the files in directories USR 304, LIB 306, PLATFORM 308, and SBIN 310 to be accessed as if they were part of the file system 180(a) for zone A 140(a), even though they are not under the root 322 of zone A 140(a). As a result, it is not necessary to copy the files in directories USR 304, LIB 306, PLATFORM 308, and SBIN 310 into directories USR 324, LIB 326, PLATFORM 328, and SBIN 330. This leads to significant storage and other system resource savings. At this point, it should be noted that referenced directories USR 304, LIB 306, PLATFORM 308, and SBIN 310 are used for illustrative purposes only. They need not be referenced, nor are they the only directories that can be referenced.

Implementing a Sparse File System for a Non-Global Zone

In one embodiment, to implement a sparse file system for a non-global zone, certain acts/operations are performed at each state of the non-global zone. Each state will be discussed separately below. To facilitate discussion, it will be assumed that zone A 140(a) is the subject zone for which a sparse file system is to be implemented.

Configured State

As noted previously, when a non-global zone is configured, various configuration parameters are specified for the zone, with some parameters pertaining to the file system for the zone and other parameters pertaining to other aspects of the zone. In one embodiment, the parameters pertaining to the file system include but are not limited to: (1) a path to the root directory of the file system; (2) a specification of all of the directories and subdirectories that are to be created under the root directory, and all of the zone-specific files that are to be stored in those directories and subdirectories; (3) whether a sparse file system is desired; and (4) if so, a list of the desired virtual directories and their references to other file system directories.

In the present example, to cause a sparse file system to be implemented for zone A 140(a), the following are specified in the configuration information for zone A 140(a): (1) the path to the root directory 322 of the file system for zone A 140(a) is /Zones/ZoneA/Root; (2) the zone-specific directory to be created is ETC 332, and certain packages of files are to be installed under this directory; (3) a sparse file system is desired; (4) the virtual directories are USR 324, LIB 326, PLATFORM 328, and SBIN 330; and (5) these virtual directories reference directories USR 304, LIB 306, PLATFORM 308, and SBIN 310, respectively.

As an alternative to specifying the virtual directories, it is possible to just specify that a sparse file system is desired, and to program the kernel 150 with enough logic to know that virtual directories USR 324, LIB 326, PLATFORM 328, and SBIN 330 are to be created, and that these directories reference directories USR 304, LIB 306, PLATFORM 308, and SBIN 310, respectively. This and other implementations are within the scope of the present invention.

Installed State

To transition a non-global zone from the Configured state to the Installed state, an administrator in the global zone 130 invokes an operating system utility (in one embodiment, zoneadm). When invoked, the operating system utility interacts with the kernel 150 to access the configuration information associated with the non-global zone, and to use that information to carry out the installation process. In one embodiment, the kernel 150 performs the following operations for our example of non-global zone A 140(a).

Initially, using the path specification in the configuration information, the kernel 150 determines the root of the file system to be root 322. The kernel 150 then creates the zone-specific directory ETC 332 under root 322, and installs all of the specified zone-specific files therein. The kernel 150 then determines that a sparse file system is desired; thus, it accesses the list of virtual directories, and creates a directory for each. In the present example, the kernel 150 creates directories USR 324, LIB 326, PLATFORM 328, and SBIN 330 under root 322. In one embodiment, these directories are just created; they are not populated with any files. Thus, the files in directories USR 304, LIB 306, PLATFORM 308, and SBIN 310 are not copied into the virtual directories USR 324, LIB 326, PLATFORM 328, and SBIN 330.

In some implementations, the files in the referenced directories USR 304, LIB 306, PLATFORM 308, and SBIN 310 may have some associated metadata. This metadata may be useful for certain purposes, such as for example to facilitate the upgrade of the files in the referenced directories. In one embodiment, if such metadata exists, the kernel 150 stores a copy of the metadata into the root directory 322, or a subdirectory thereof.

Ready State

To transition a non-global zone from the Installed state to the Ready state, an administrator in the global zone 130 invokes an operating system utility (in one embodiment, zoneadm again), which causes a zoneadmd process 162 to be started. In the present example with zone A 140(a), zoneadmd 162(*a*) is started. Once started, zondadmd 162(*a*) interacts with the kernel 150 to establish zone A 140(*a*).

In establishing zone A 140(*a*), several operations are performed, including but not limited to creating zone A 140(*a*), and establishing a file system 180(*a*) for zone A 140(*a*). In one embodiment, in creating zone A 140(*a*), a number of operations are performed, including but not limited to assigning a unique zone ID to zone A 140(*a*), and creating a data structure associated with zone A 140(*a*). This data structure will be used to store a variety of information associated with zone A 140(*a*), including for example, the zone ID.

To establish the file system 180(*a*) for zone A 140(*a*), the kernel 150 initially accesses the configuration information for zone A 140(*a*) and extracts therefrom the path (/Zones/ZoneA/Root) to the root directory 322. The kernel 150 then establishes this directory 322 as the root of the file system 180(*a*) for zone A 140(*a*). This may involve, for example, storing the path in the zone A data structure for future reference.

After the root directory 322 is determined and established, the kernel 150 determines, based upon the configuration information for zone A 140(*a*), whether there are any virtual directories. If so, the kernel 150 determines which directories are virtual directories. Further, the kernel 150 determines the directory referenced by each virtual directory. Thereafter, in one embodiment, the kernel 150 mounts the referenced directory onto the virtual directory.

In the current example, the virtual directories are directories USR 324, LIB 326, PLATFORM 328, and SBIN 330, and the referenced directories are USR 304, LIB 306, PLATFORM 308, and SBIN 310. Thus, kernel 150 mounts directory USR 304 onto virtual directory USR 324, mounts directory LIB 306 onto virtual directory LIB 326, mounts directory PLATFORM 308 onto virtual directory PLATFORM 328, and mounts directory SBIN 310 onto virtual directory SBIN 330. In one embodiment, each referenced directory is mounted onto a virtual directory as a loopback file system (LOFS). LOFS, which is a virtual file system, is known in the art and need not be described in detail herein.

In one embodiment, when the kernel 150 mounts a referenced directory onto a virtual directory, it stores a set of semantics information in association with the virtual directory. This semantics information includes an indication that the virtual directory is part of a virtual file system, and more specifically, a LOFS. The semantics information also includes a reference to the referenced directory. In addition, for security reasons, the semantics information may indicate that access to the referenced directory is on a read-only basis. Since the directories USR 304, LIB 306, PLATFORM 308, and SBIN 310 contain files that are used by all zones, including the global zone 130, making the access to these directories read-only ensures that a process in a non-global zone will not be able to change any of the files, which in turn helps to ensure that the process will not be able to change or affect the behavior of other zones.

In one embodiment, as a further security precaution, the kernel 150 checks, before mounting a referenced directory, whether the referenced directory is part of the file system of another non-global zone 140. If so, the kernel 150 will not mount the referenced directory since doing so would enable one non-global zone to access the file system of another non-global zone.

Running State

To transition a non-global zone from the Ready state to the Running state, the zoneadmd process associated with the non-global zone starts an init process. In the current example, zoneadmd 162(*a*) starts the init process 172(*a*) in zone A 140(*a*). Once started, the init process 172(*a*) looks in the file system 180(*a*) (for example, in directory ETC 332) of zone A 140(*a*) to determine what applications to run. The init process 172(*a*) then executes those applications to give rise to one or more other processes 174. In this manner, processes 170(*a*) are started within zone A 140(*a*).

During operation, a process 170(*a*) in zone A 140(*a*) may submit a request to the kernel 150 to access a file in one of the virtual directories (assume the USR directory 324 for the sake of example). In one embodiment, the kernel 150 responds to this request by determining the zone with which the process is associated (zone A 140(*a*) in this example). The kernel 150 then accesses the data structure associated with zone A 140(*a*), and extracts therefrom the path to the root directory 322. From the root directory 322, the kernel traverses the file system until it reaches the requested virtual directory USR 324. Then, using the reference in the semantics information associated with virtual directory USR 324, the kernel 150 follows the reference to the referenced directory USR 304. Once there, the kernel 150 accesses the requested file in the referenced directory USR 304, or a subdirectory therein.

In one embodiment, as part of accessing the requested file, the kernel 150 determines whether a copy of the file already exists in virtual memory. If so, the kernel 150 accesses and uses the copy already in virtual memory rather than creating another copy in virtual memory. This helps to prevent the redundant storage of files in virtual memory, which leads to more efficient use of the virtual memory space.

Sharing of Files by Multiple Non-Global File Systems

FIG. 3 shows just the virtual directories USR 324, LIB 326, PLATFORM 328, and SBIN 330 of zone A 140(*a*) referencing the referenced directories USR 304, LIB 306, PLATFORM 308, and SBIN 310. It should be noted, however, that the file systems of multiple non-global zones may reference the same referenced directories. In fact, the more file systems that reference the same referenced directories, the more sharing is done between file systems, and the greater the resource savings.

Figure 4:
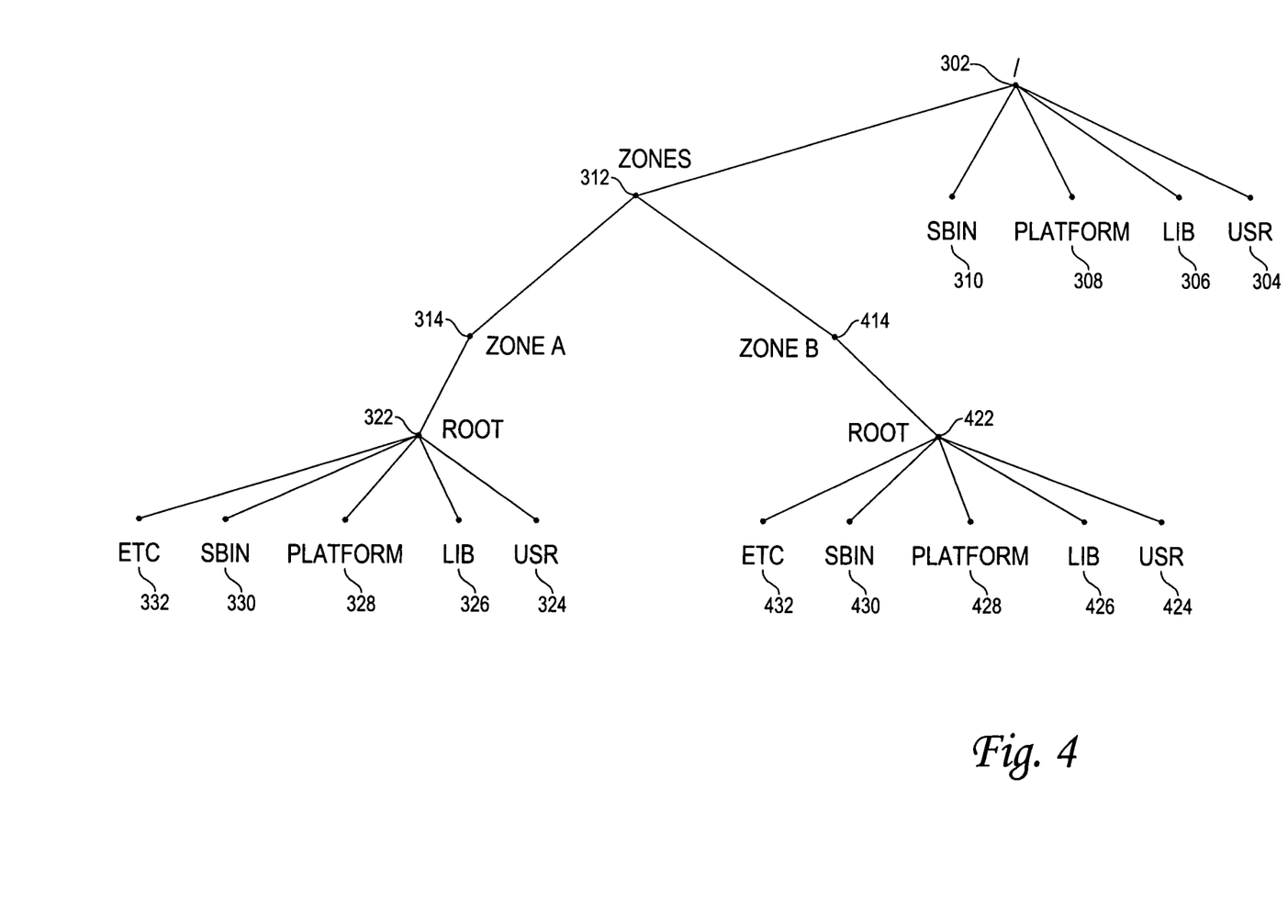
FIG. 4 is an expanded version of FIG. 3, which further includes the file system of zone B of FIG. 1.

To illustrate this point, FIG. 4 shows an expanded version of the overall file system, which includes the file system 180(*b*) for non-global zone B 140(*b*). Like the file system for zone A 140(*a*), the file system for zone B 140(*b*) has a root directory 422. It also has an ETC directory 432 for storing zone-specific files. In addition, it has virtual directories USR 424, LIB 426, PLATFORM 428, and SBIN 430. These virtual directories may reference the same directories as those referenced by zone A 140(*a*). Namely, USR directory 424 may reference USR directory 304, LIB directory 426 may reference LIB directory 306, PLATFORM directory 428 may reference PLATFORM directory 308, and SBIN directory 430 may reference SBIN 310. As a result, the file systems 180(*a*), 180(*b*) for zone A 140(*a*) and zone B 140(*b*) may share the files in the referenced directories USR 304, LIB 306, PLATFORM 308, and SBIN 310.

The same process described above in connection with zone A 140(*a*) may be applied to zone B 140(*b*) (and other non-global zones 140) to set up the file system of zone B 140(*b*) shown in FIG. 4. More specifically, zone B 140(B) may be created in the manner described above. Likewise, the file system 180(*b*) of zone B 180(*b*) may be established in the manner described above, where the kernel 150 mounts the referenced directories onto the virtual directories as virtual file systems. More particularly, kernel 150 mounts directory USR 304 onto virtual directory USR 424, mounts directory LIB 306 onto virtual directory LIB 426, mounts directory PLATFORM 308 onto virtual directory PLATFORM 428, and mounts directory SBIN 310 onto virtual directory SBIN 430. Thus, the process described above may be applied to any number of non-global zones 140 to enable the non-global zones to share the files stored in the referenced directories USR 304, LIB 306, PLATFORM 308, and SBIN 310.

Hardware Overview

Figure 5:
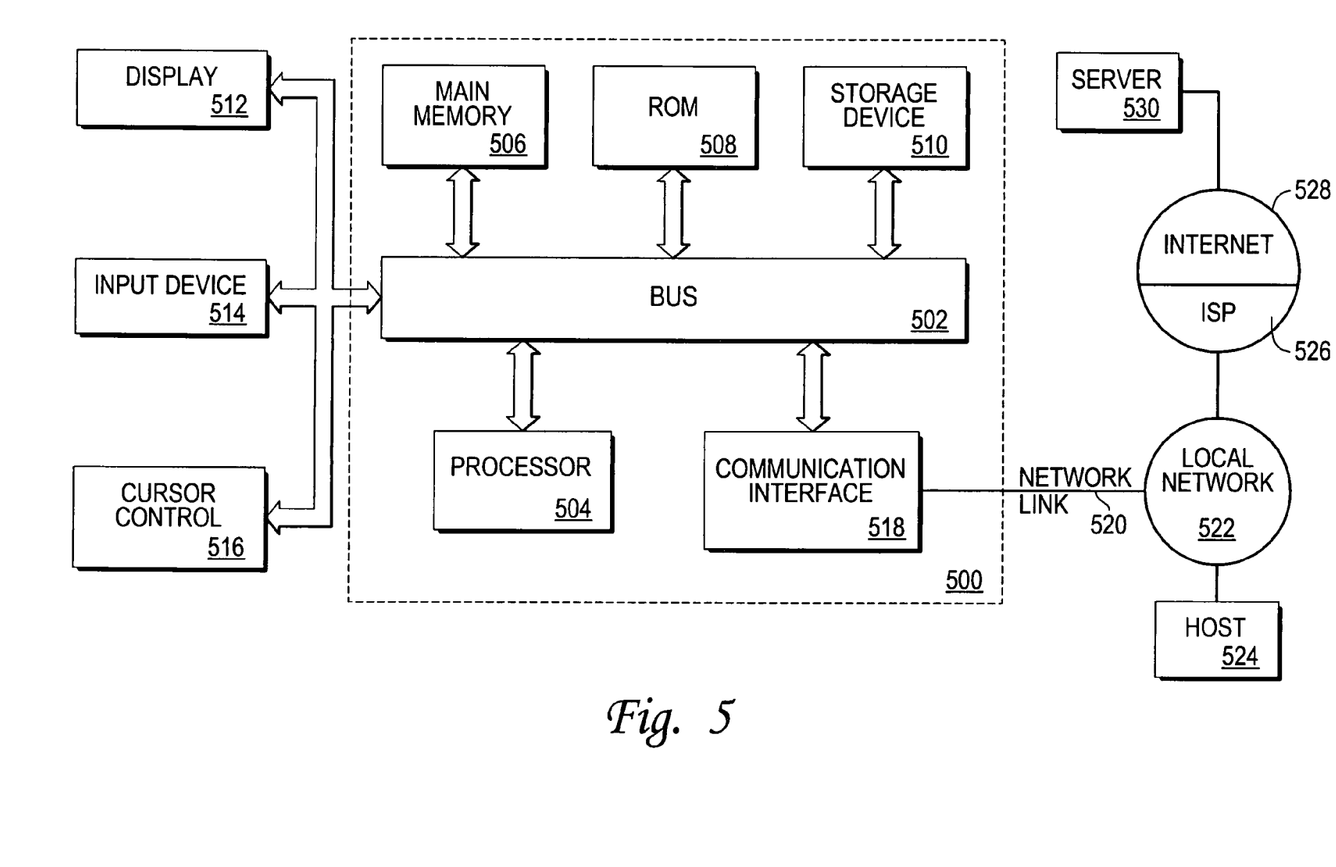
FIG. 5 is a block diagram of a general purpose computer system in which one embodiment of the present invention may be implemented.

FIG. 5 is a block diagram that illustrates a computer system 500 upon which an embodiment of the invention may be implemented. Computer system 500 includes a bus 502 for facilitating information exchange, and one or more processors 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions by processor 504. Computer system 500 may further include a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

In computer system 500, bus 502 may be any mechanism and/or medium that enables information, signals, data, etc., to be exchanged between the various components. For example, bus 502 may be a set of conductors that carries electrical signals. Bus 502 may also be a wireless medium (e.g. air) that carries wireless signals between one or more of the components. Bus 502 may also be a medium (e.g. air) that enables signals to be capacitively exchanged between one or more of the components. Bus 502 may further be a network connection that connects one or more of the components. Overall, any mechanism and/or medium that enables information, signals, data, etc., to be exchanged between the various components may be used as bus 502.

Bus 502 may also be a combination of these mechanisms/media. For example, processor 504 may communicate with storage device 510 wirelessly. In such a case, the bus 502, from the standpoint of processor 504 and storage device 510, would be a wireless medium, such as air. Further, processor 504 may communicate with ROM 508 capacitively. In this instance, the bus 502 would be the medium (such as air) that enables this capacitive communication to take place. Further, processor 504 may communicate with main memory 506 via a network connection. In this case, the bus 502 would be the network connection. Further, processor 504 may communicate with display 512 via a set of conductors. In this instance, the bus 502 would be the set of conductors. Thus, depending upon how the various components communicate with each other, bus 502 may take on different forms. Bus 502, as shown in FIG. 5, functionally represents all of the mechanisms and/or media that enable information, signals, data, etc., to be exchanged between the various components.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. For example, while the referenced directories USR 304, LIB 306, PLATFORM 308, and SBIN 310 have been disclosed as containing actual files, it should be noted that this is not required. Rather, the referenced directories themselves may be virtual directories, which reference other directories. This and other modifications may be made within the spirit of the invention. Thus, the invention should not be limited by the specific embodiments used to illustrate it but only by the scope of the issued claims.

What is claimed is:

1. A machine-implemented method, comprising:
    creating, within a global operating system environment provided by an operating system, a first non-global partition which serves to isolate processes running within that partition from other non-global partitions within the global operating system environment; and
    establishing a first file system for the first non-global partition, wherein the first file system cannot be accessed by processes running in any non-global partition other than the first non-global partition, wherein the first file system comprises at least one virtual directory, which has associated therewith a reference to another particular file system directory, and wherein the virtual directory comprises no actual files or directories.

2. The method of claim 1, wherein the virtual directory is part of a virtual file system, which has been mounted into the first file system.

3. The method of claim 2, wherein the virtual file system is a loopback file system.

4. The method of claim 1, wherein establishing the first file system comprises:
    mounting the other particular file system directory onto the virtual directory.

5. The method of claim 4, wherein mounting comprises:
    storing a set of semantics associated with the virtual directory, wherein the set of semantics indicates that the virtual directory is part of a virtual file system.

6. The method of claim 5, wherein the set of semantics further comprises the reference to the other particular file system directory.

7. The method of claim 1, wherein the first file system has a first root directory associated therewith, wherein the first file system is a portion of an overall file system associated with the global operating system environment, wherein the overall file system has an overall root directory which is above the first root directory in a directory hierarchy, and wherein processes running with the first non-global partition cannot traverse above the first root directory in the directory hierarchy.

8. The method of claim 1, wherein the first file system is a portion of an overall file system associated with the global operating system environment, and wherein the other particular file system directory resides in a portion of the overall file system that is not a part of the first file system.

9. The method of claim 1, wherein the other particular file system directory, or a subdirectory thereof, comprises one or more actual files.

10. The method of claim 9, wherein processes running within the first non-global partition have read-only access to the one or more actual files.

11. The method of claim 1, wherein the other particular file system directory is a virtual directory, which has associated therewith a reference to yet another file system directory.

12. The method of claim 1, further comprising:
    creating, within the global operating system environment, a second non-global partition which serves to isolate processes running within that partition from other non-global partitions within the global operating system environment; and
    establishing a second file system for the second non-global partition, wherein the second file system cannot be accessed by processes running in any non-global partition other than the second non-global partition, and wherein the second file system comprises at least one virtual directory, which has associated therewith a reference to the other particular file system directory.

13. The method of claim 12, wherein the other particular file system directory, or a subdirectory thereof, comprises one or more actual files which are shared by the first and second non-global partitions.

14. The method of claim 12, wherein establishing the second file system comprising:
    mounting the other particular file system directory onto the virtual directory of the second file system.

15. The method of claim 14, wherein mounting comprises:
    storing a second set of semantics associated with the virtual directory of the second file system, wherein the second set of semantics indicates that the virtual directory of the second file system is part of a second virtual file system, and wherein the second set of semantics further comprises the reference to the other particular file system directory.

16. The method of claim 1, further comprising:
    receiving a request from a process running within the first non-global partition to access a particular file;
    traversing the first file system to the virtual directory;

following the reference to the other particular file system directory; and accessing the particular file from the other particular file system directory, or a subdirectory thereof.

17. The method of claim 16, wherein accessing the particular file comprises:

determining whether a copy of the particular file is already in virtual memory; and in response to a determination that a copy of the particular file is already in virtual memory, using the copy already in virtual memory rather than making another copy in the virtual memory.

18. An apparatus, comprising:

a mechanism for creating, within a global operating system environment provided by an operating system, a first non-global partition which serves to isolate processes running within that partition from other non-global partitions within the global operating system environment; and a mechanism for establishing a first file system for the first non-global partition, wherein the first file system cannot be accessed by processes running in any non-global partition other than the first non-global partition, wherein the first file system comprises at least one virtual directory, which has associated therewith a reference to another particular file system directory, and wherein the virtual directory comprises no actual files or directories.

19. The apparatus of claim 18, wherein the virtual directory is part of a virtual file system, which has been mounted into the first file system.

20. The apparatus of claim 19, wherein the virtual file system is a loopback file system.

21. The apparatus of claim 18, wherein the mechanism for establishing the first file system comprises:

a mechanism for mounting the other particular file system directory onto the virtual directory.

22. The apparatus of claim 21, wherein the mechanism for mounting comprises:

a mechanism for storing a set of semantics associated with the virtual directory, wherein the set of semantics indicates that the virtual directory is part of a virtual file system.

23. The apparatus of claim 22, wherein the set of semantics further comprises the reference to the other particular file system directory.

24. The apparatus of claim 18, wherein the first file system has a first root directory associated therewith, wherein the first file system is a portion of an overall file system associated with the global operating system environment, wherein the overall file system has an overall root directory which is above the first root directory in a directory hierarchy, and wherein processes running with the first non-global partition cannot traverse above the first root directory in the directory hierarchy.

25. The apparatus of claim 18, wherein the first file system is a portion of an overall file system associated with the global operating system environment, and wherein the other particular file system directory resides in a portion of the overall file system that is not a part of the first file system.

26. The apparatus of claim 18, wherein the other particular file system directory, or a subdirectory thereof, comprises one or more actual files.

27. The apparatus of claim 26, wherein processes running within the first non-global partition have read-only access to the one or more actual files.

28. The apparatus of claim 18, wherein the other particular file system directory is a virtual directory, which has associated therewith a reference to yet another file system directory.

29. The apparatus of claim 18, further comprising:

a mechanism for creating, within the global operating system environment, a second non-global partition which serves to isolate processes running within that partition from other non-global partitions within the global operating system environment; and a mechanism for establishing a second file system for the second non-global partition, wherein the second file system cannot be accessed by processes running in any non-global partition other than the second non-global partition, and wherein the second file system comprises at least one virtual directory, which has associated therewith a reference to the other particular file system directory.

30. The apparatus of claim 29, wherein the other particular file system directory, or a subdirectory thereof, comprises one or more actual files which are shared by the first and second non-global partitions.

31. The apparatus of claim 29, wherein the mechanism for establishing the second file system comprising:

a mechanism for mounting the other particular file system directory onto the virtual directory of the second file system.

32. The apparatus of claim 31, wherein the mechanism for mounting comprises:

a mechanism for storing a second set of semantics associated with the virtual directory of the second file system, wherein the second set of semantics indicates that the virtual directory of the second file system is part of a second virtual file system, and wherein the second set of semantics further comprises the reference to the other particular file system directory.

33. The apparatus of claim 18, further comprising:

a mechanism for receiving a request from a process running within the first non-global partition to access a particular file;

a mechanism for traversing the first file system to the virtual directory;

a mechanism for following the reference to the other particular file system directory; and a mechanism for accessing the particular file from the other particular file system directory, or a subdirectory thereof.

34. The apparatus of claim 33, wherein the mechanism for accessing the particular file comprises:

a mechanism for determining whether a copy of the particular file is already in virtual memory; and a mechanism for using, in response to a determination that a copy of the particular file is already in virtual memory, the copy already in virtual memory rather than making another copy in the virtual memory.

35. A machine-readable storage medium, comprising:

instructions for causing one or more processors to create, within a global operating system environment provided by an operating system, a first non-global partition which serves to isolate processes running within that partition from other non-global partitions within the global operating system environment; and instructions for causing one or more processors to establish a first file system for the first non-global partition, wherein the first file system cannot be accessed by processes running in any non-global partition other than the first non-global partition, wherein the first file system comprises at least one virtual directory, which has associated therewith a reference to another particular file system directory, and wherein the virtual directory comprises no actual files or directories.

36. The machine-readable storage medium of claim 35, wherein the virtual directory is part of a virtual file system, which has been mounted into the first file system.

37. The machine-readable storage medium of claim 36, wherein the virtual file system is a loopback file system.

38. The machine-readable storage medium of claim 35, wherein the instructions for causing one or more processors to establish the first file system comprises:

instructions for causing one or more processors to mount the other particular file system directory onto the virtual directory.

39. The machine-readable storage medium of claim 38, wherein the instructions for causing one or more processors to mount comprises:

instructions for causing one or more processors to store a set of semantics associated with the virtual directory, wherein the set of semantics indicates that the virtual directory is part of a virtual file system.

40. The machine-readable storage medium of claim 39, wherein the set of semantics further comprises the reference to the other particular file system directory.

41. The machine-readable storage medium of claim 35, wherein the first file system has a first root directory associated therewith, wherein the first file system is a portion of an overall file system associated with the global operating system environment, wherein the overall file system has an overall root directory which is above the first root directory in a directory hierarchy, and wherein processes running with the first non-global partition cannot traverse above the first root directory in the directory hierarchy.

42. The machine-readable storage medium of claim 35, wherein the first file system is a portion of an overall file system associated with the global operating system environment, and wherein the other particular file system directory resides in a portion of the overall file system that is not a part of the first file system.

43. The machine-readable storage medium of claim 35, wherein the other particular file system directory, or a subdirectory thereof, comprises one or more actual files.

44. The machine-readable storage medium of claim 43, wherein processes running within the first non-global partition have read-only access to the one or more actual files.

45. The machine-readable storage medium of claim 35, wherein the other particular file system directory is a virtual directory, which has associated therewith a reference to yet another file system directory.

46. The machine-readable storage medium of claim 35, further comprising:

instructions for causing one or more processors to create, within the global operating system environment, a second non-global partition which serves to isolate processes running within that partition from other non-global partitions within the global operating system environment; and instructions for causing one or more processors to establish a second file system for the second non-global partition, wherein the second file system cannot be accessed by processes running in any non-global partition other than the second non-global partition, and wherein the second file system comprises at least one virtual directory, which has associated therewith a reference to the other particular file system directory.

47. The machine-readable storage medium of claim 46, wherein the other particular file system directory, or a subdirectory thereof, comprises one or more actual files which are shared by the first and second non-global partitions.

48. The machine-readable storage medium of claim 46, wherein the instructions for causing one or more processors to establish the second file system comprises:

instructions for causing one or more processors to mount the other particular file system directory onto the virtual directory of the second file system.

49. The machine-readable storage medium of claim 48, wherein the instructions for causing one or more processors to mount comprises:

instructions for causing one or more processors to store a second set of semantics associated with the virtual directory of the second file system, wherein the second set of semantics indicates that the virtual directory of the second file system is part of a second virtual file system, and wherein the second set of semantics further comprises the reference to the other particular file system directory.

50. The machine-readable storage medium of claim 35, further comprising:

instructions for causing one or more processors to receive a request from a process running within the first non-global partition to access a particular file;

instructions for causing one or more processors to traverse the first file system to the virtual directory;

instructions for causing one or more processors to follow the reference to the other particular file system directory; and instructions for causing one or more processors to access the particular file from the other particular file system directory, or a subdirectory thereof.

51. The machine-readable storage medium of claim 50, wherein the instructions for causing one or more processors to access the particular file comprises:

instructions for causing one or more processors to determine whether a copy of the particular file is already in virtual memory; and instructions for causing one or more processors to use, in response to a determination that a copy of the particular file is already in virtual memory, the copy already in virtual memory rather than making another copy in the virtual memory.

* * * * *